(12) United States Patent
Nash et al.

(10) Patent No.: US 8,755,643 B2
(45) Date of Patent: Jun. 17, 2014

(54) FIBRE OPTIC SENSOR PACKAGE

(75) Inventors: Philip John Nash, Surrey (GB); David John Hill, Dorset (GB)

(73) Assignee: Optasense Holdings Ltd. (GB)

( * ) Notice: Subject to any disclaimer, the term of this patent is extended or adjusted under 35 U.S.C. 154(b) by 12 days.

(21) Appl. No.: 12/293,172

(22) PCT Filed: Mar. 29, 2007

(86) PCT No.: PCT/GB2007/001147
§ 371 (c)(1),
(2), (4) Date: Sep. 16, 2008

(87) PCT Pub. No.: WO2007/113495
PCT Pub. Date: Oct. 11, 2007

(65) Prior Publication Data
US 2009/0087136 A1 Apr. 2, 2009

(30) Foreign Application Priority Data
Apr. 6, 2006 (GB) .................................. 0606935.5

(51) Int. Cl.
G02B 6/00 (2006.01)
G01H 9/00 (2006.01)
G01V 1/18 (2006.01)

(52) U.S. Cl.
CPC ................ *G01H 9/004* (2013.01); *G01V 1/184* (2013.01); *G01V 1/186* (2013.01)
USPC .............................................. 385/12; 385/13

(58) Field of Classification Search
None
See application file for complete search history.

(56) References Cited

U.S. PATENT DOCUMENTS

| 4,588,296 | A | * | 5/1986 | Cahill et al. | ................... 356/462 |
| 4,956,549 | A | * | 9/1990 | Henning et al. | .......... 250/227.14 |
| 5,039,221 | A | | 8/1991 | Layton et al. | |
| 5,475,216 | A | * | 12/1995 | Danver et al. | ............ 250/227.14 |
| 5,680,489 | A | * | 10/1997 | Kersey | .............................. 385/12 |
| 6,233,374 | B1 | * | 5/2001 | Ogle et al. | ........................ 385/13 |
| 6,728,165 | B1 | * | 4/2004 | Roscigno et al. | ................ 367/14 |
| 6,955,085 | B2 | * | 10/2005 | Jones et al. | ................ 73/514.26 |
| 7,305,153 | B2 | * | 12/2007 | Meyer | .............................. 385/12 |
| 2001/0020675 | A1 | * | 9/2001 | Tubel et al. | ............... 250/227.11 |
| 2003/0038634 | A1 | | 2/2003 | Strack | |
| 2004/0067002 | A1 | * | 4/2004 | Berg et al. | ......................... 385/12 |
| 2005/0279532 | A1 | | 12/2005 | Ballantyne | |

FOREIGN PATENT DOCUMENTS

| GB | 2310280 | 1/1997 |
| GB | 2311131 | 9/1997 |
| GB | 2364380 | 1/2002 |
| WO | WO 01/42806 | 6/2001 |

* cited by examiner

*Primary Examiner* — Uyen Chau N Le
*Assistant Examiner* — Chad Smith
(74) *Attorney, Agent, or Firm* — McDonnell Boehnen Hulbert & Berghoff LLP

(57) ABSTRACT

A fiber-optic sensor package (10) comprises a serial array of fiber-optic sensing coils (14, 16, 18, 20, 22) each of which is comprised in a respective fiber-optic sensor. Four (14, 16, 18, 22) of the coils are housed in a protective casing (24). One of the coils (22) is comprised in a fiber-optic electromagnetic field sensor. The other coils are comprised in respective fiber-optic geophones and/or hydrophones. A single package of the invention allows detection of both seismic and electromagnetic signals. An array of packages of the invention provides detection of both seismic and electromagnetic signal at a series of positions over a long distance or wide area, thus avoiding the need for two conventional arrays. A packages of the invention, and an array of such packages, require little or no electrical power input.

18 Claims, 4 Drawing Sheets

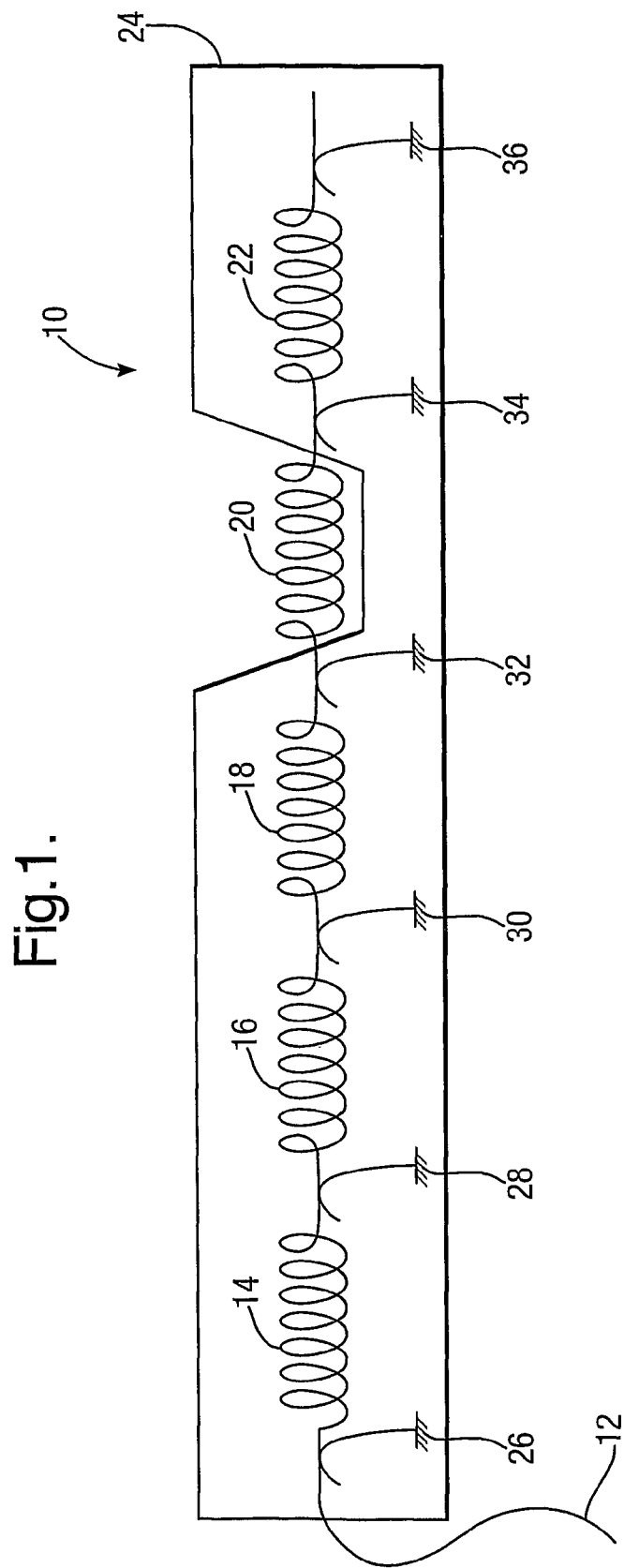

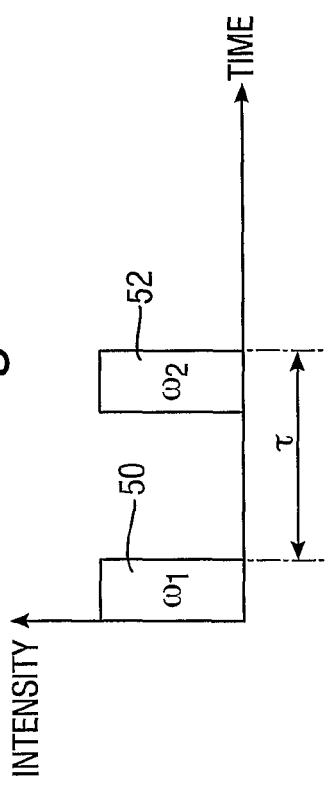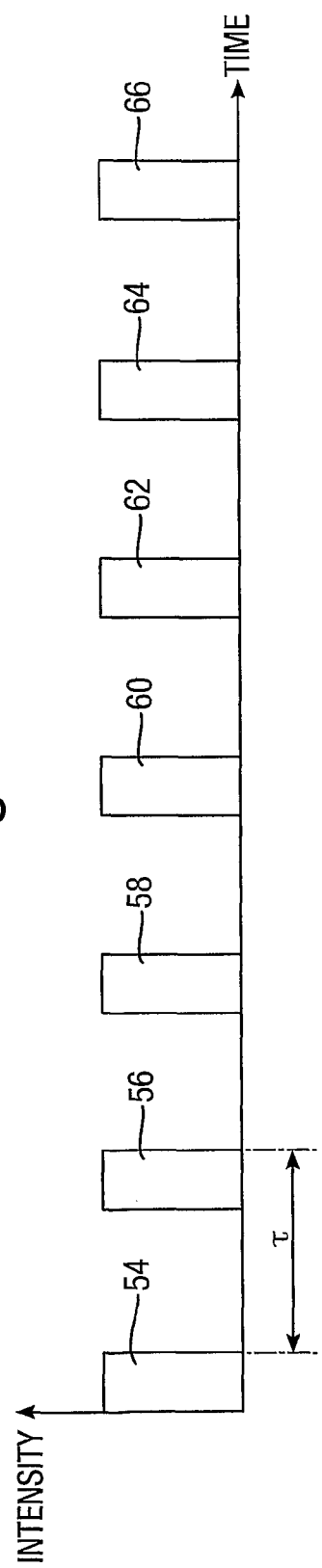

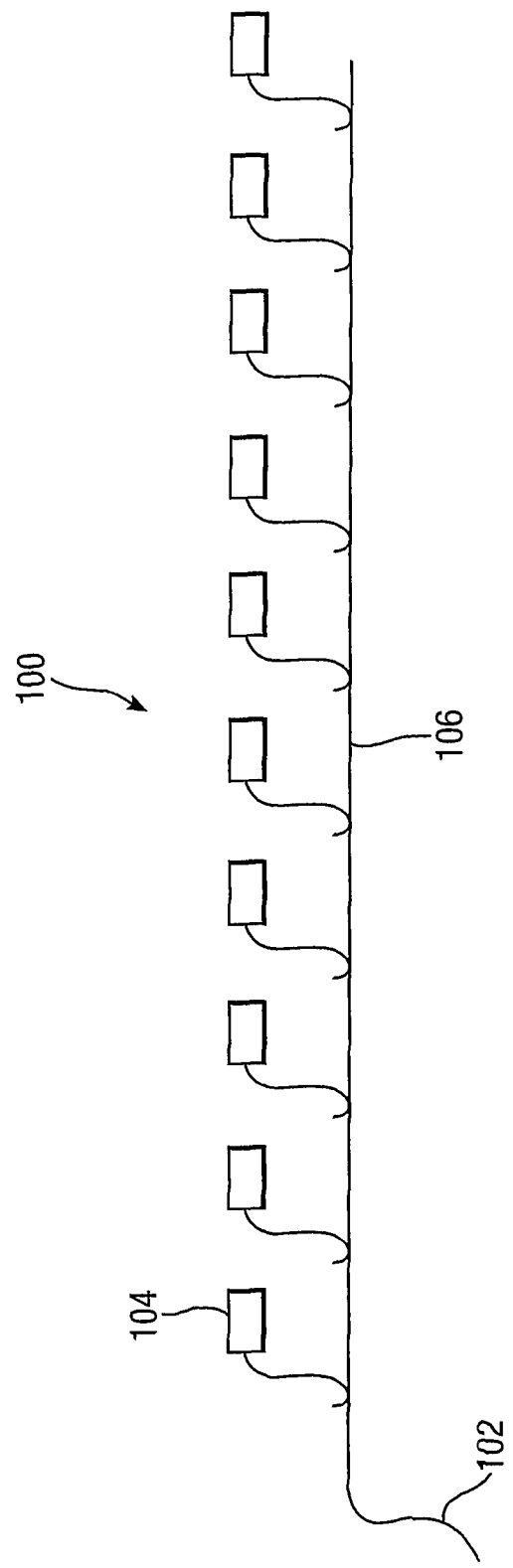

FIBRE OPTIC SENSOR PACKAGE

BACKGROUND OF THE IVENTION (1) Field of the Invention

The invention relates to fibre-optic sensor packages.

(2) Description of the Art

There are presently two principal techniques for carrying out surveys for detecting new hydrocarbon reservoirs and re-examining existing ones. The first technique is seismic and involves towing an acoustic noise source over the top of a reservoir (or suspected reservoir) and using arrays of electro-mechanical geophones and/or hydrophones to detect seismic signals reflected from geological strata. (In this specification, the term 'geophone' is taken to mean a vibration sensor which measures either velocity or acceleration). The hydrophones and/or geophones can be either temporarily or permanently placed in position. This technique gives a significant level of detail relating to geological formations but gives only an indirect indication of the presence and exact location of hydrocarbon deposits.

The second technique is electromagnetic surveying, which involves moving a strong varying electric field source into a series of positions over a reservoir and using an electromagnetic field sensor, for example a voltage sensor, to measure electric field strength at a corresponding series of locations. The frequency of the electric field is low, typically between 0.5 and 5 Hz. This provides information on the conductivity of structures below each position which can be used to more directly determine the location of hydrocarbon deposits.

The two techniques are complementary and it is preferred to use both in order to gather the most complete information about a hydrocarbon reservoir. Two entirely separate surveys are therefore needed to assess a single reservoir, each requiring deployment of particular electro-mechanical detection apparatus as well as separate sources of probing radiation. This makes for difficult, time-consuming and expensive surveying. Furthermore, as easily-exploitable hydrocarbon deposits become exhausted, smaller and more inaccessible deposits are being sought. In order for the exploitation of these deposits to be economically viable, the time and cost involved in finding and assessing them need to be minimised. The deployment of two sets of electro-mechanical detection apparatus is unlikely to be economically viable in the case of small hydrocarbon deposits.

Another problem associated with existing detection apparatus is that the electro-mechanical sensors used in them require significant inputs of electrical power. This involves penalties in terms of cost and complexity of the detection apparatus.

SUMMARY OF THE INVENTION

It is an object of the invention to overcome or ameliorate these problems. According to a first aspect of the invention, there is provided a fibre-optic sensor package comprising first and second fibre-optic sensors wherein the first fibre-optic sensor is a fibre-optic electromagnetic field sensor and the second fibre-optic sensor is a fibre-optic geophone or hydrophone, said package adapted to provide outputs from said first and second sensors in response to a single interrogation signal.

In this way, a single package according to the invention is able to detect both acoustic and electromagnetic signals in the vicinity of the package substantially simultaneously. Additionally, the fibre-optic nature of the package means that it is more robust and reliable than a standard electro-mechanical sensor, and requires little or no electrical power input. A single array of packages of the invention allows detection of both acoustic and electromagnetic signals substantially simultaneously over a long distance or wide area. The array can be interrogated periodically to provide a time varying response, and provision can be made for time division multiplexing of signals input and received from the array.

The second fibre-optic sensor may be a fibre-optic geophone, the package further comprising two additional fibre-optic geophones. This provides a fibre-optic sensor package able to detect its own motion in three directions in addition to an electromagnetic field in which the package is present.

Alternatively, or in addition a fibre-optic hydrophone can be provided, affording the ability to detect acoustic signals in water, as well an electromagnetic field in which the package is present. This can provide a single package which can detect motion, acoustic signals in water and electromagnetic fields and which is particularly suitable for underwater surveying.

The sensors of the package may conveniently be mounted in or to a single body, allowing for a single compact unit capable of sensing electromagnetic and vibrational stimuli. Such a unit can be substantially rigid affording protection to the individual sensors and easily coupled to a bus fibre in a modular array arrangement.

Preferably, the fibre optic sensors are optically coupled in series, and more preferably each package includes a single input/output fibre, through which interrogation signals are input and sensed information signals output. The package may be interrogated in a known fashion by inputting a signal comprising two optical input pulses having different frequencies. In response to the two input pulses, a package comprising three geophones, a hydrophone and an electromagnetic sensor typically outputs a series of seven output pulses, the second to sixth pulses carrying information from respective fibre-optic sensors in the package.

In a package of the invention having three fibre-optic geophones, preferably the detection axes of the geophones are substantially mutually orthogonal in order to provide detection of motion of the package having components along each of these directions.

The fibre-optic optic electromagnetic field sensor may be a fibre-optic voltage sensor, thus providing a package able to detect electric fields. The fibre-optic voltage sensor may comprise electrostrictive or piezoelectric material and a length of sensing fibre mechanically coupled to the material such that deformation of the material results in a force being applied to said length of sensing fibre. This allows an electric field to alter the phase of optical radiation guided within the length of sensing fibre.

A particularly effective arrangement for the fibre-optic voltage sensor is one in which the electrostrictive or piezoelectric material is in the form of a mandrel and the length of sensing fibre is wound around the mandrel. To increase sensitivity, the voltage sensor preferably includes a pair of electrodes, the mandrel being disposed between the electrodes.

In one embodiment the mandrel comprises electrostrictive material, and the package further comprises means arranged to apply an alternating voltage across the electrodes. This arrangement allows a voltage signal of low frequency $\Omega$ to be detected with little 1/f noise. Since the response of electrostrictive material to an applied electric field is non-linear, the phase of light in the length of sensing fibre of the voltage sensor is modulated at frequencies $\omega \pm \Omega$ where $\omega$ is the frequency of the applied alternating voltage. Output radiation from the voltage sensor may be processed to produce a signal corresponding to its phase, and a heterodyne technique used to recover the low frequency signal $\Omega$ with much less 1/f noise than is the case if the signal at Ω is detected directly. Significant 1/f noise reduction is achieved if ω/2π>50 Hz. Preferably ω/2π>100 Hz. This embodiment would be used in cases where the frequency content of the voltage to be detected is below around 2 Hz.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

DESCRIPTION OF THE FIGURES

Embodiments of the invention are described below by way of example only and with reference to the accompanying drawings in which:

FIG. 1 schematically illustrates a fibre-optic sensor package of the invention;

FIG. 2 illustrates a pair of optical pulses suitable for interrogating the FIG. 1 package;

FIG. 3 illustrates a series of optical output pulses generated by the FIG. 1 package in response to input of the FIG. 2 pulse pair;

FIG. 5 schematically illustrates a fibre-optic sensor array comprising a plurality of packages of the invention arranged in parallel.

DESCRIPTION OF THE INVENTION

Figure 4:
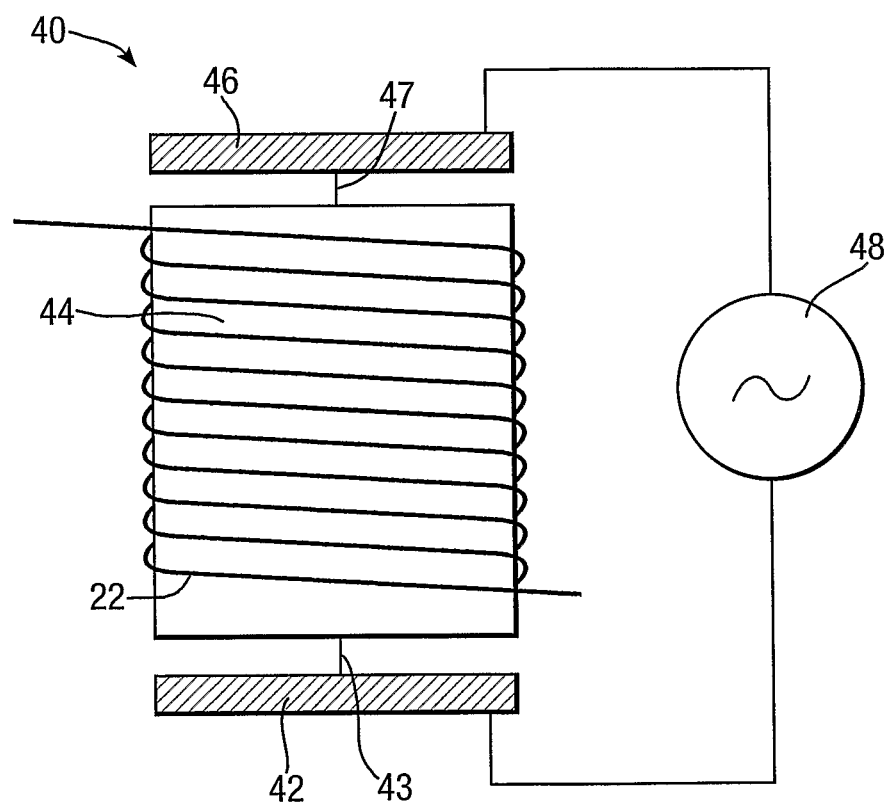
FIG. 4 shows a fibre-optic voltage sensor comprised in the FIG. 1 package.

In FIG. 1, a fibre-optic sensor package of the invention is indicated generally by 10. The package 10 comprises three fibre-optic geophones having respective sensing lengths of optical fibre in the form of coils 14, 16, 18 of optical fibre. The package 10 further comprises a fibre-optic hydrophone and a fibre-optic voltage sensor having respective coils 20, 22 of optical fibre. Mechanical parts of the fibre-optic sensors are omitted from FIG. 1 in the interests of clarity. The coils 14, 16, 18, 20, 22 of fibre are optically coupled in series; each has a length l of 40 m. Coils 14, 16, 18 and 22 are housed within a protective casing 24.

The package 100 has an input/output (i/o) fibre 12. Fibre-coupled mirrors 26, 28, 30, 32, 34 are coupled to input ends of coils 14, 16, 18, 20, 22 respectively. The package 10 has a terminal reflector 36. A portion of optical radiation output from any coil is coupled to the fibre-coupled reflector coupled at the input end of the next coil (or the terminal reflector in the case of coil 22).

FIG. 2 illustrates a signal comprising a pair of pulses 50, 52 which may be input to the i/o fibre 12 to interrogate the package 10. The pulses 50, 52 have different frequencies; pulse 52 is delayed by $\tau=2l/c=400$ ns with respect to pulse 50, where c is the speed of light in fibre (assumed to be $2\times10^8$ ms$^{-1}$ for the purposes of this description).

FIG. 3 shows a series of seven output pulses 54, 56, 58, 60, 62, 64, 66 output via the i/o fibre 12 in response to input signal of the pair of pulses 50, 52 of FIG. 2. Pulse 54 results from reflection of a portion of pulse 50 from fibre-coupled mirror 26. Pulse 66 results from reflection of a portion of pulse 52 from the terminal reflector 36. Each of the other pulses 56, 58, 60, 62, 64 consists of a portion of pulse 50 and a portion of pulse 52. For example, output pulse 60 consists of a portion of pulse 50 reflected from fibre-coupled mirror 32 and a portion of pulse 52 reflected from fibre-coupled mirror 30. The portion of pulse 50 reflected from fibre-coupled mirror 32 undergoes a phase shift with respect to the portion of pulse 52 reflected from fibre-coupled mirror 30, due to a double-pass through coil 18. Pulse 60 therefore carries output from the geophone of which coil 18 is a part in the form of optical phase information. Similarly, output pulses 56 and 58 carry optical phase information from geophones of which coils 14 and 16 are part. Output pulse 62 carries optical phase information from the hydrophone of which coil 20 is part, and output pulse 64 carries optical phase information from the voltage sensor of which coil 22 is part. Therefore information from all sensing coils is output substantially simultaneously in response to a single interrogating input signal. Output pulses 54 and 66 carry no useful information.

Phase information from the fibre-optic sensors in the package 10 may be obtained over time by repeated interrogation, i.e. by repeated input of pulse pairs of the form shown in FIG. 2. To recover the phase information provided by the nth sensor in the package 10, the (n+1)th pulse in each output pulse series is extracted by time-demultiplexing and detected at a detector to produce a signal having a phase which varies according to the phase variation in radiation guided within the sensing coil of that fibre-optic sensor.

The voltage sensor of which coil 22 is part is indicated generally by 40 in FIG. 4. The voltage sensor 40 comprises a cylindrical mandrel 44 of electrostrictive material disposed between two metallic electrodes 42, 46. Electrical connections 43, 47 place the electrodes 42, 46 in electrical contact with respective ends of the mandrel 44. Coil 22 is wound around the mandrel. An alternating voltage source 48 is arranged to apply an alternating voltage having a frequency ω/2π=150 Hz across the electrodes 42, 46.

By detecting the sixth pulse in each output pulse series of the package 10 on a photodiode an electrical signal may be generated which has a phase variation corresponding to the optical phase variation of radiation guided within the coil 22 of the voltage sensor 40. Since the mechanical response of the mandrel to an electric field is quadratic, the phase variation of the electrical signal has the form $(\omega\pm\Omega)t$. Phase demodulation of the electrical signal produces signals at sideband frequencies ω±Ω. Mixing with the signal at ω output by the source 48 provides a signal at frequency Ω with significantly less 1/f noise than would be the case in the event of direct detection at the frequency Ω (i.e. without use of the source 48).

FIG. 5 schematically illustrates an array 100 comprising ten fibre-optic sensor packages, such as 104, each having a structure as illustrated in FIG. 1. The packages are coupled in parallel to an optical fibre 106 one end 102 of which serves as the input/output fibre of the array 100. The array 100 allows simultaneous detection of acceleration, vibration and electric fields at each of the ten locations where the packages of the array are located.

An alternative package of the invention comprises a voltage sensor which consists only of a sensing optical fibre wound around a mandrel of electrostrictive or piezoelectric material. This embodiment is preferred for detecting voltages having a frequency content above around 2 Hz as it has a simple construction (no alternating voltage source is required) and requires no electrical power supply. 1/f noise is not a significant problem in detecting voltages signals having a frequency content above around 2 Hz.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A fibre-optic sensor package comprising first and second fibre-optic sensors wherein the first fibre-optic sensor is a fibre-optic electromagnetic field sensor and the second fibre-optic sensor includes three fibre-optic geophones, wherein said first and second fibre-optic sensors comprise optical fibre coils, and are mounted on a single package body to produce a substantially rigid single compact unit, the package providing outputs from said first and second sensors in response to a single interrogation signal comprising two optical input pulses, and further wherein said three geophones and said electromagnetic field sensor are all arranged to provide a series of optical output pulses in response to said interrogation signal; wherein said optical input pulses and said optical output pulses are transmitted over a single optical fibre.

2. A fibre-optic sensor package according to claim 1, further comprising a hydrophone.

3. A fibre-optic sensor package according to claim 1, wherein said fibre optic sensors are optically coupled in series.

4. A fibre-optic sensor package according to claim 1 wherein the fibre-optic sensors each comprise respective equal lengths of sensing fibre, and wherein each length of sensing fibre has a partial reflector at an input end thereof and the package has a terminal reflector.

5. A fibre-optic sensor package according to claim 1 wherein detection axes of the fibre-optic geophones are substantially mutually orthogonal.

6. A fibre-optic sensor package according to claim 1 wherein the fibre-optic electromagnetic field sensor is a fibre-optic voltage sensor.

7. A fibre-optic sensor package according to claim 6 wherein the fibre-optic voltage sensor comprises electrostrictive or piezoelectric material and a length of sensing fibre mechanically coupled to the material such that deformation of the electrostrictive material results in a force being applied to said length of sensing fibre.

8. A fibre-optic sensor package according to claim 7 wherein the electrostrictive or piezoelectric material is in the form of a mandrel and wherein said length of sensing fibre is wound around the mandrel.

9. A fibre-optic sensor package according to claim 8 and further comprising a pair of electrodes in electrical contact with the mandrel, the mandrel being disposed between the electrodes.

10. A fibre-optic sensor package according to claim 9 wherein the mandrel comprises electrostrictive material and wherein the package further comprises means arranged to apply an alternating voltage across the electrodes.

11. A fibre-optic sensor package according to claim 10 wherein the alternating voltage has a frequency of at least 50 Hz.

12. A fibre-optic sensing package according to claim 11 wherein the alternating voltage has a frequency of at least 100 Hz.

13. A fibre-optic sensor array comprising a plurality of fibre-optic sensing packages each of which is a fibre-optic sensor package according to any preceding claim.

14. A method of simultaneously detecting seismic and electromagnetic signals comprising the steps of deploying a package according to claim 1 and processing optical signals output from said package.

15. The method of claim 14, further comprising the step of inputting pulsed, frequency-shifted optical radiation to the package to produce the optical output signals and wherein the step of processing the output signals is carried out by extracting optical phase information therefrom.

16. A fibre-optic sensor package comprising first and second fibre-optic sensors wherein the first fibre-optic sensor is a fibre-optic voltage sensor and the second fibre-optic sensor includes three fibre-optic geophones, wherein said first and second fibre-optic sensors are mounted on a single package body, the package providing outputs from said first and second sensors in response to a single interrogation signal, wherein the fibre-optic voltage sensor comprises electrostrictive or piezoelectric material in the form of a mandrel in contact with, and disposed between, a pair of electrodes, and a length of sensing fibre wound around the mandrel, such that deformation of the electrostrictive material results in a force being applied to said length of sensing fibre, and further wherein the package comprises means arranged to apply an alternating voltage across the electrodes.

17. A fibre-optic sensor package according to claim 16 wherein the alternating voltage has a frequency of at least 50 Hz.

18. A fibre-optic sensing package according to claim 16 wherein the alternating voltage has a frequency of at least 100 Hz.

* * * * *